March 4, 1930.  T. V. BUCKWALTER  1,748,973
PROCESS OF MOUNTING ROLLER BEARINGS ON CAR AXLES
Filed Feb. 16, 1929
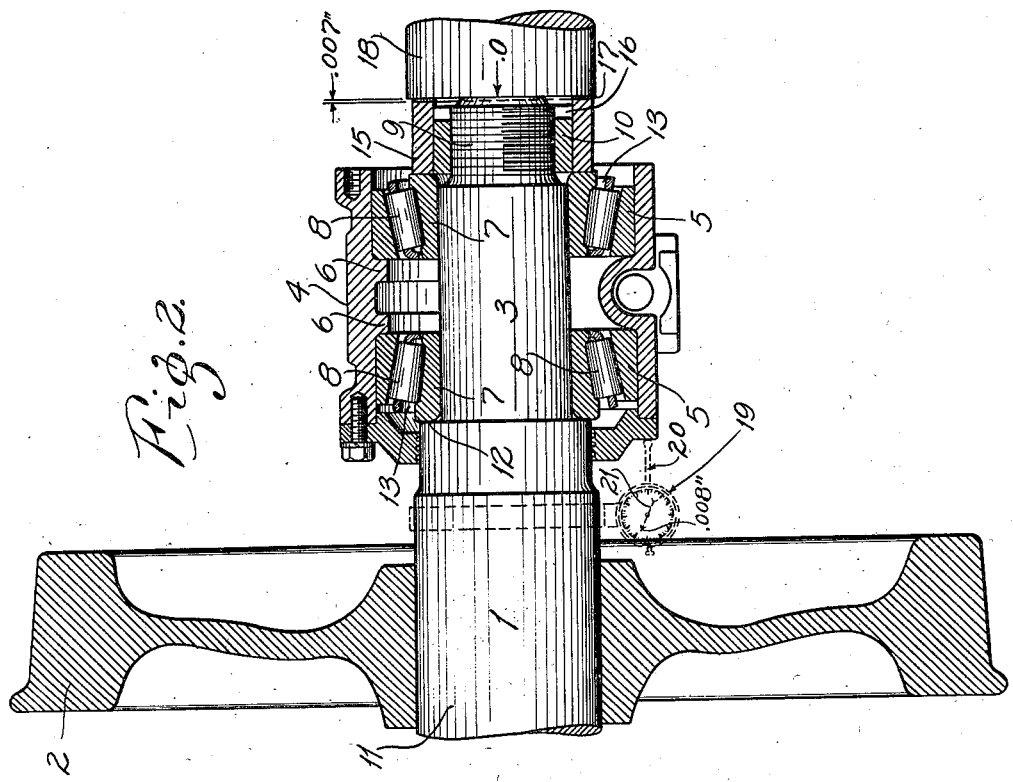
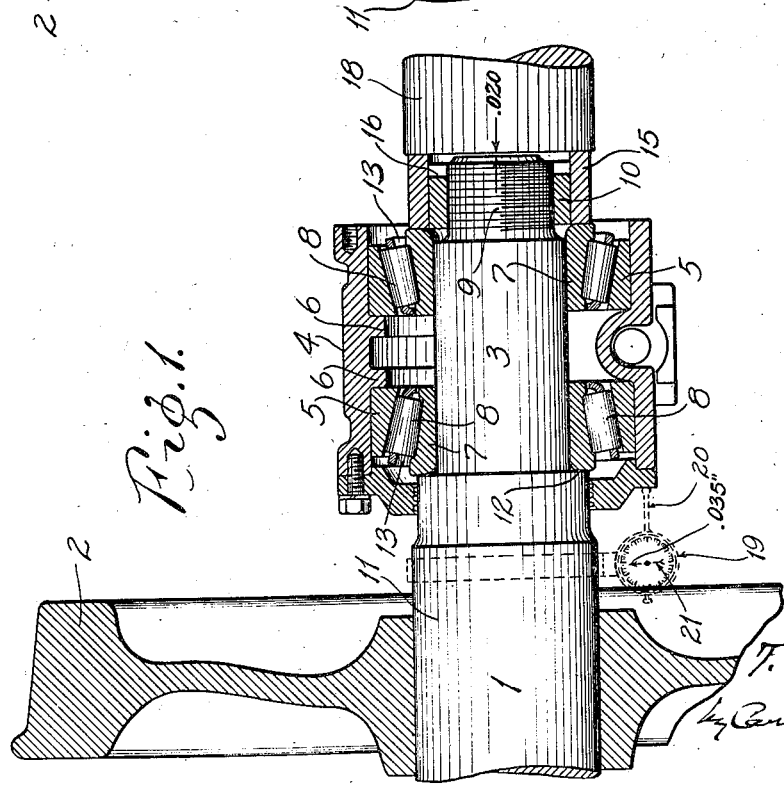
INVENTOR:
T. V. Buckwalter
HIS ATTORNEYS.

Patented Mar. 4, 1930

1,748,973

UNITED STATES PATENT OFFICE

TRACY V. BUCKWALTER, OF CANTON, OHIO, ASSIGNOR TO THE TIMKEN ROLLER BEARING COMPANY, OF CANTON, OHIO, A CORPORATION OF OHIO

PROCESS OF MOUNTING ROLLER BEARINGS ON CAR AXLES

Application filed February 16, 1929. Serial No. 340,418.

This invention relates to processes of mounting roller bearings on car axles. The present application is a continuation in part of my copending application Serial No. 234,634, filed November 21, 1927.

There are numerous well known reasons that make it desirable to interpose roller bearings between the journal portions of car axles and the journal boxes; but heretofore it has been difficult to assemble the parts of the roller bearings suitable for such heavy duty with the precision required. The purpose of the present invention is to devise a process that makes it practicable to assemble such bearing parts with the required precision.

In the accompanying drawing, which forms part of this specification and wherein like symbols refer to like parts wherever they occur, Fig. 1 is a longitudinal sectional view of a roller bearing axle construction after the ram has pressed the outer bearing cone to a position in which the endwise play of the journal box may be determined;

Fig. 2 is a similar view of the roller bearing axle construction at the end of its final stage of assembly, with the ram of the press in contact with the end of the axle and with shims equal to the access play of the housing interposed between the ram and distance sleeve that abuts against the outer bearing cone.

It is common practice to press-fit car wheels on their axles; and Fig. 1 of the drawing illustrates a car axle 1 with the wheels 2 press-fitted thereon and with the journal portions 3 between the respective wheels and the adjacent ends of the axle. In lieu of the journals of the ordinary axle, that fit in ordinary journal boxes, the present axle adapts each of the journal boxes to receive two conical bearing cups 5 whose large ends abut against an annular rib 6 provided therefor in the inside of the journal box or housing 4. Each end of the axle 1 is provided with two cones 7 or inner bearing members corresponding to their respective cups or outer bearing members 5, and a circular series of taper rollers 8 are interposed between each cup 5 and the corresponding cone 7. Each end 9 of the axle beyond the journal portion 3 is reduced in diameter and threaded to receive a nut 10 that is of sufficient diameter to abut endwise against the large end of the cone 7 of the outer bearing.

On account of their size and the heavy duty to which such roller bearings are subjected in service and the resulting necessity of making them heavier and stronger than roller bearings in other relations, the usual practices of assembling and adjusting roller bearing parts are practically inapplicable. This is particularly true on account of the need for a heavy press-fit of the outer bearing cone 7 on the axle and the inability to adjust such cone after it leaves the hydraulic press.

According to the present invention, the diameter of the journal portion 3 of the axle is less than that of the wheel seat 11, and the inner of the two bearing cones 7 beyond such wheel seat 11 is press-fitted on such journal and forced home against the shoulder 12 formed by the reduction of the diameter of the axle. The cage 13 and rollers 8 are then slipped over the end of the axle, and the journal box or housing 4 with the cup of such inner bearing fitted in its inner end is also slipped over the end of the axle, whereby the parts of the inner bearing are brought into proper relation to one another. The cup 5 of the outer bearing is fitted into the outer end of the journal box 4 or housing either before or after (preferably before) the said housing is slipped onto the axle. The other cage 13 and rollers 8 are then slipped over the end of the axle and the outer bearing cone is press-fitted on the axle and forced endwise thereon to the precise position required.

The operation of mounting the outer cone 7 on the axle is as follows: The axle 1 is placed in a hydraulic press with the several parts, except the outer bearing cone, assembled thereon. The outer bearing cone 7 is then slipped over the end of the axle with its smaller end started onto the journal portion 3 of the axle. A dummy nut 10 is then screwed onto the threaded end 9 of the axle and a distance sleeve 15 is slipped over said dummy nut. The dummy nut preferably has a cylindrical surface and a castellated outer end 16, and is shorter than the distance sleeve 15, which has a sliding fit thereon. The length of the distance sleeve 15 is equal to or slightly less than the distance from the plane of the end face of the axle 1 to the plane of the back face of the outer bearing cone 7 when said bearing cone is in its adjusted position.

The ram is then engaged with the outer end of the distance sleeve 15 to force the outer bearing cone 7 along the axle to a position somewhat short of its final adjustment. The extent of looseness of adjustment is then determined by measuring the play or extent of movement of the housing lengthwise of the axle, say, for the sake of illustration, about thirty-five-thousandths of an inch. As proper adjustment requires a slight play of the housing endwise of the axle, say for sake of example, eight-thousandths of an inch, the proper adjustment of the outer bearing requires it to be moved lengthwise an amount equal to the total amount of its endwise play minus the amount of play desired for final adjustment. In the given case, this amount is thirty-five thousandths of an inch minus eight-thousandths of an inch, that is to say, twenty-seven thousandths of an inch, which is the amount that the outer bearing must be moved endwise of the axle to secure the desired permanent position of adjustment. After it has been determined that the outer bearing must be moved lengthwise of the axle twenty-seven-thousandths of an inch to bring it into its permanent position of adjustment, the distance between the end of the axle and the overhanging outer end of the sleeve is determined and this amount, say, for sake of example, twenty-thousandths of an inch, is subtracted from twenty-seven-thousandths of an inch, the movement required to bring the outer bearing cone to its proper position of adjustment, leaving seven-thousandths of an inch. Thin annular shims 17 having an aggregate thickness of seven-thousandth of an inch are then interposed between the outer end of the distance sleeve and the face of the ram, and the ram is then operated until the face thereof abuts against the end of the axle, thereby forcing the outer bearing cone forward twenty-seven-thousandths of an inch further and bringing it into its permanent position of adjustment. It is noted that in the given case the distance between the adjacent ends of the axle and distance sleeves in the semifinal stage of assembly is twenty-thousandths of an inch, thereby requiring the use of shims having an aggregate thickness of seven-thousandths of an inch to secure a total movement of twenty-seven-thousandths of an inch when the ram is in contact with the end of the axle. However, the thickness of shims required to move the outer bearing cone to its permanent position of adjustment will vary according to distance between the end of the axle and the end of the distance sleeve in the semifinal stage of assembly. In other words, if the outer end of the distance sleeve is flush with the outer end of the axle in the semifinal stage of assembly, the thickness of shims required will equal the distance that the outer bearing cone must be forced forward to bring it into its permanent position of adjustment.

An efficient way of measuring the play or extent of movement of the housing lengthwise of the axle in the semifinal stage of assembly is to strap dial indicator 19 on said axle inwardly of said housing with a radially movable bar extending parallel with the axle and operatively connected to an arm 21 that swings over the face of the dial. The difference between the readings of the swinging arm with the housing at its inner and outer positions gives the play of such housing.

The drawing illustrates a construction wherein each end of the axle is equipped with two series of taper rollers that taper towards each other. Obviously, the process is applicable to a construction wherein each end of the axle is equipped with a single series of taper rollers, with the rollers of each series tapering toward the rollers of the other series. In such case, the truck construction joins the housings for the two ends of the axle together so as to function after the manner of the single housing 4 illustrated in the drawing.

What I claim is:

1. The process of providing a car axle with taper roller bearings, which comprises press-fitting on said axle a bearing cone that tapers towards a second bearing cone hereinafter mentioned, slipping onto said axle bearing cups that are relatively fixed and have taper rollers between them and said cones respectively, slipping onto the axle said second bearing cone tapering toward said first mentioned cone, slipping over the end of the axle a sleeve adapted to bear against the end of said second cone, measuring the endwise play of the cups in the position of the sleeve thus established, placing opposite the outer end of said sleeve shims of a thickness equal to the excess play of said cups, and moving a ram against said shims until its face reaches the plane occupied by said outer end of said sleeve when said measurement was made, said axle being meanwhile held in fixed position.

2. The process of providing a car axle with taper roller bearings, which comprises press-fitting on said axle a bearing cone that tapers towards a second bearing cone hereinafter mentioned, slipping onto said axle bearing cups that are relatively fixed and have taper rollers between them and said cones respectively, slipping onto the axle said second bearing cone tapering toward said first mentioned cone, slipping over the end of the axle a sleeve adapted to bear against the end of said second cone, moving a ram against said sleeve to a predetermined position, measuring the endwise play of the cups in the position of the sleeve thus established, interposing between said sleeve and said ram shims of a thickness equal to the excess play of said cups, and again moving said ram to said predetermined position, said axle being meanwhile held in fixed position.

3. The process of providing a car axle with taper roller bearings, which comprises press-fitting on said axle a bearing cone that tapers towards a second bearing cone hereinafter mentioned, slipping onto said axle bearing cups that are relatively fixed and have taper rollers between them and said cones respectively, slipping onto the axle said second bearing cone tapering toward said first mentioned cone, forcing said second bearing cone along said axle to a position short of the final position, measuring the endwise play of the cups in the position of the second bearing cone thus established, and then forcing said second bearing cone further along said axle a distance equal to the excess play of said cups, said axle being meanwhile held in fixed position.

4. The process of providing a car axle with taper roller bearings interposed between said axle and the journal box, which comprises press-fitting on said axle a bearing cone that tapers outwardly, slipping over the end of said axle a housing with bearing cups seated therein and with rollers between said bearing cone and the inner bearing cup, slipping an inwardly tapering outer bearing cone over the end of the axle with rollers interposed between it and the outer bearing cup, forcing said outer bearing cone along said axle to a position short of proper adjustment, measuring the play of the housing, and again forcing said outer bearing cone endwise of said axle an amount equal to the excess play of said housing, said axle being meanwhile held in fixed position.

5. The process of providing a car axle with taper roller bearings, which comprises press-fitting on said axle a bearing cone that tapers towards a second bearing cone hereinafter mentioned, slipping onto said axle bearing cups that are relatively fixed and have taper rollers between them and said cones respectively, slipping onto the axle said second bearing cone tapering toward said first mentioned cone, slipping over the end of the axle a sleeve adapted to bear against the end of said second cone, moving a ram against said sleeve to force said second bearing cone along said axle to a position short of its final adjustment, measuring the endwise play of the cups in the position of the sleeve thus established, and moving said ram into contact with the end of said axle with shims interposed between said ram and sleeve of a thickness sufficient to move said second bearing cone to its permanent position of adjustment, said axle being meanwhile held in fixed position.

Signed at Canton, Ohio, this 7th day of February, 1929.

TRACY V. BUCKWALTER.